United States Patent [19]

Verberne et al.

[11] 4,132,566

[45] Jan. 2, 1979

[54] METHOD FOR THE SEPARATION OF WHEAT GLUTEN AND WHEAT STARCH

[75] Inventors: Petrus Verberne, Hoogezand; Wilhelmus R. M. Zwitserloot, Milsbeek (L); Robijn R. Nauta, Haren (Gr.), all of Netherlands

[73] Assignee: Scholten-Honig Research B.V., Netherlands

[21] Appl. No.: 823,036

[22] Filed: Aug. 9, 1977

[30] Foreign Application Priority Data

Aug. 24, 1976 [GB] United Kingdom ............... 35141/76

[51] Int. Cl.² .............................................. C13L 1/00
[52] U.S. Cl. ...................................... 127/65; 127/67; 260/112 G
[58] Field of Search ........................ 127/65, 67, 69, 71; 260/112 G

[56] References Cited

U.S. PATENT DOCUMENTS

| | | | |
|---|---|---|---|
| 2,530,823 | 11/1950 | Kilander | 127/65 X |
| 2,642,185 | 6/1953 | Fontein | 127/71 X |
| 2,798,011 | 7/1957 | Fontein | 127/65 X |
| 2,974,068 | 3/1961 | Fontein | 127/65 X |
| 3,463,770 | 8/1969 | Fellers | 127/67 X |
| 3,489,605 | 1/1970 | Plaven | 127/67 X |
| 3,493,384 | 2/1970 | Fellers | 127/67 X |
| 3,574,180 | 4/1971 | Johnston | 27/67 X |
| 3,575,710 | 4/1971 | Plaven | 127/67 |
| 3,901,725 | 8/1975 | Bond | 127/69 X |
| 3,951,938 | 4/1976 | Kerkronen | 127/67 X |

*Primary Examiner*—Sidney Marantz
*Attorney, Agent, or Firm*—O'Brien and Marks

[57] ABSTRACT

A method for the separation of wheat gluten and wheat starch. A mixture containing wheat starch, wheat protein and water is treated in a hydrocyclone apparatus. The gluten agglomerates in the hydrocyclones and is carried along in the overflow fraction. The bulk of the starch is contained in a fraction separated at the tapping point.

10 Claims, 1 Drawing Figure

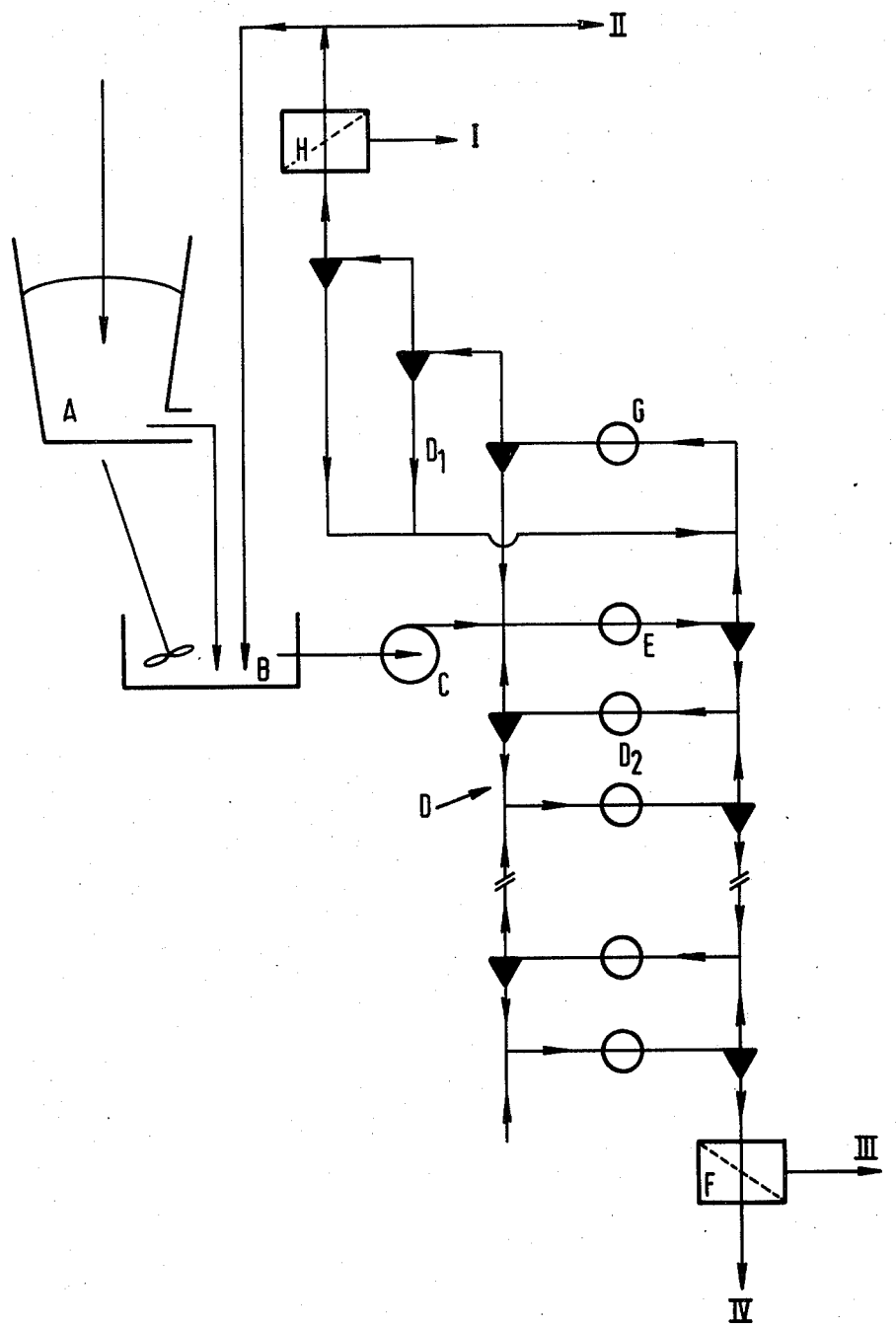

METHOD FOR THE SEPARATION OF WHEAT GLUTEN AND WHEAT STARCH

This invention relates to a method for the separation of wheat gluten and wheat starch, preferably from wheat flour.

Beside the traditional Martin process, in which wheat flour is formed into a dough with water, and starch is extracted from the formed dough by washing, methods have been developed in which starch and gluten are separated from free-flowing mixtures of wheat flour and water.

The so-called continuous batter process, described in "The Chemistry of Wheat Starch and Gluten and their Conversion Products" (1965) by J.W. Knight pp. 27–30, involves producing a free-flowing batter from wheat flour and water in a continuous mixer. After a definite retention time in the mixer the starch is washed from the gluten by passing the batter to a pump and supplying simultaneously wash water to the pump. The gluten are isolated by screening.

According to a variant of the "Fesca"-method, described in "Journal of Food Science" 36 (1971) p. 649–652 a homogenized mixture of wheat flour and water is separated into a starch fraction and a liquid protein concentrate by a centrifugation procedure. The gluten are not isolated from the protein concentrate, but the protein concentrate is dried as a whole. Supplementary to this method the gluten may be isolated from the protein concentrate by agglomeration at a suitable temperature and holding time under strong agitation and separation of the agglomerated gluten, as described in British Pat. specification No. 1,397,370.

All methods above described comprise different stages (i.e. agglomeration, washing, separation) which are carried out with different equipment.

According to the present invention a method is provided in which the separation of starch and the agglomeration of gluten from wheat is carried out in one step by passing a mixture containing a wheat protein and wheat starch and water through a hydrocyclone apparatus.

The recovery of wheat gluten is facilitated significantly by this method. Moreover, the use of a hydrocyclone apparatus allows a strong reduction of the consumption of water, which is of great importance in solving the waste water problem and in saving energy.

Thus according to the present invention there is provided a method for the separation of wheat gluten and wheat starch, characterized in that a mixture containing wheat protein and wheat starch and water is introduced into a hydrocylone apparatus in which:

(a) the gluten agglomerates in the hydrocyclone and is carried along in agglomerated form in the overflow fraction.

(b) a fraction is separated, at the tapping point, which contains the bulk of the starch.

Preferably wheat flour is used for making the batter. Flour of hard as well as soft types of wheat can be used as starting material for the method according to the invention.

The fact that with the new procedure grades of wheat flour can be used which are not suitable for use in the existing commercial wheat starch manufacturing methods is of great economic advantage.

It is also possible to use whole meal from wheat or other forms of processing wheat such as e.g. flaked wheat instead of wheat flour.

BRIEF DESCRIPTION OF THE DRAWING

The FIGURE is a schematic illustration of the hydrocyclone apparatus for separating wheat gluten and wheat starch.

In the following the method of the invention is described by way of example with reference to wheat flour.

In carrying out the production of gluten and starch from wheat flour according to the method of the invention, wheat flour is mixed with a sufficient amount of water to obtain complete hydration of the flour and to form a pumpable batter. The amount of water is about 1.5 tons of water per ton of wheat flour. The mixing can be performed in any suitable apparatus and the prepard batter does not require a prolonged retention time. An adjustment of the natural pH of the batter or addition of chemicals e.g. to improve hydration of the gluten, is not needed, but may be practiced under special circumstances.

The pumpable batter is, without any further interstage, introduced into the hydrooyclone apparaus, in which a spontaneous agglomeration of the gluten to threads and clots takes place. The phenomenon that the gluten agglomerates in the hydrocyclone is unexpected and amazing. Moreover, it is surprising that the gluten agglomerates, which may be several cm long, do not influence the performance of the hydrocylone. No blocking or choking of the hydrocyclones occurs.

It further turns out that the gluten agglomerates formed can easily be separated from the overflow of the hydrocyclones by screening.

In the hydrocyclone apparatus a heavy fraction is separated from the batter. This heavy fraction, which contains the bulk of starch (prime grade starch or A-starch) and the bulk of the fibre, leaves the hydrocyclone apparatus at the tapping point. The aqueous mixture of prime grade starch and fibre is subsequently subjected to a screening procedure in order to separate the starch from the fibre. In order to obtain a still purer grade starch, the hydrocyclone apparatus may also include an hydrocyclone washing section. Fresh water is supplied to the last washing stage of this washing section. Other methods of purification e.g. washing with water in separators or centrifuges are also suitable. The pure starch suspension thereby obtained may be further concentrated, dewatered and dried.

The light fraction separated in the hydrocyclone apparatus contains besides agglomerated gluten the remaining components of the wheat flour, e.g. starch (second grade starch or B-starch), the rest of the fibre and dissolved materials. The agglomerated gluten is separated from this light fraction discharged as the overflow of the hydrocyclone apparatus and is thereafter dried. This separation can be accomplished by screening. The screens or sieves used, having an aperture in the range of from 0.3 mm to 2.0 mm, need not meet particular requirements because the agglomerated gluten can be screened easily. The screening is advantageously performed in an original rotating gluten washer, in which a further agglomeration of the gluten takes place to the well-known lumps of stiff consistency.

The liquid passing the screen contains the second grade starch and the soluble material. The second grade starch is recovered therefrom e.g. by centrifuging or decanting. The overflow of the hydrocyclone apparatus may also contain some prime grade starch. This prime grade starch can be recovered after screening the agglomerated gluten by passing the undersize stream through a number of hydrocyclones. The underflow of these cyclones, containing the prime grade starch, is recirculated to the washing section of the hydrocyclone apparatus. The overflow contains second grade starch and soluble material.

In order to effect a better separation of the starch and protein in the practical operation of the method of the invention it is preferred to recirculate a part of the gluten-free overflow from the hydrocyclone apparatus for preparation of the batter. Recirculation in combination with a suitable number of hydrocyclones stages for countercurrent washing makes possible a reduction of the consumption of water to less than about 3 m$^3$ of water per ton of wheat flour.

Further improvement of the performance of the separation is obtained by raising the temperature in the hydrocyclones above 30° C. and preferably to a range of 30° C. to 50° C. When the overflow is recirculated a raise in temperature occurs. Additional methods of raising the temperature are the introduction of preheated fresh water or of steam into the hydrocyclone apparatus.

The separation of gluten and starch from wheat flour according to the method of the invention can be carried out by means of multi-stage hydrocyclone apparatus as e.g. used in the corn starch industry. Special requirements are not needed for these apparatus: a multi-stage hydrocylone apparatus consisting of 3 hydrocyclone stages for clarifying the overflow and a multi-stage section of about 9 stages for washing in countercurrent with fresh water will be suitable. The hydrocyclone stages consist of one or a number of multihydrocyclones, e.g. as described in Dutch Pat. application No. 75,02097.

The connection in series of the hydrocyclone stages can be accomplished in several ways e.g. as described in Die Stärke 15 (1963) p. 371-373. An example of hydrocyclone apparatus which is also useful for the method of the invention is described in U.S. Pat. No. 3,890.888.

The hydrocyclones throughout the apparatus preferably have a diameter of the cylindrical part of 10-15 mm. The pressure drop across the hydrocyclones is about 3-6 bar.

The following example serves to illustrate the method of the invention by the embodiment according to the accompanying drawing. Other embodiments are however possible.

EXAMPLE

Wheat flour from silo (A) is mixed in a mixer (B) with the sieved overflow from hydrocyclone apparatus (D) and/or with make-up water to form a pumpable batter. The weight ratio of the flour to the sieved overflow is in the range of about 1:1.5. The batter is introduced into hydrocyclone apparatus (D) by means of pump C. Hydrocyclone apparatus (D) consists of 12 hydrocyclone stages of which the 3 upper stages function as clarifying stages (D$_1$) and the remaining 9 stages function as washing stages (D$_2$). The batter mixed with the underflow of the hydrocyclone section and the overflow of the washing hydrocyclone section, is supplied by means of a pump (E) to the first washing hydrocyclone stage. At this stage the batter is divided into an overflow fraction containing light components and an underflow fraction containing heavy components. This division is repeated at each subsequent washing hydrocyclone stage. Fresh, wash water of a temperature of 40° C. is introduced at V into the supply conduit of the last washing hydrocyclone stage, which discharges at the tapping point an aqueous starch suspension containing fibre. The fibre is removed at III after fibration by means of a screening apparatus (F). The pure, fibre-free starch suspension leaving at IV is concentrated, and starch is recovered in known manner, by means of a vacuum filter and pneumatic drying. The protein content of the starch is 0.3% on dry basis. The overflow from the washing section (D$_2$), consisting of water, gluten, small starch granules and dissolved components, is conducted by means of pump (G) into the three-stage section (D$_1$). The agglomerated gluten is carried along in the overflow of this section and is screened from the overflow by means of the rotating gluten washer apparatus (H) with a mesh size of 0.5 mm. The gluten leaving at I are dried pneumatically to a gluten product containing approximately 80% protein, on dry basis (factor 5.7).

The fraction passing screening apparatus rotating gluten washer (H) is divided into two parts. One part is used for the preparation of the batter of wheat flour, whereas the other part leaving at I is evaporatd and dried after recovery of the second grade starch.

The hydrocyclone apparatus functions under the following conditions: The diameter of the cylindrical part of hydrocyclones in all multihydrocyclone stages is 10 mm. The pressure drop across the hydrocyclone is 3.5 bar. The quantity of fresh water supplied in the refining stage amounts to about 2.5 m$^3$ water per ton of wheat flour.

We claim

1. A method for the separation of wheat gluten and wheat starch comprising mixing water with a wheat product selected from the group consisting of wheat flour, whole wheat meal and flaked wheat, pumping the aqueous mixture into a hydrocyclone apparatus, agglomerating the wheat gluten of the wheat product while in the hydrocyclone apparatus, dividing the mixture by means of the hydrocyclone apparatus into an overflow fraction containing the agglomerated gluten and an underflow fraction containing the bulk of the starch, said agglomerating and said dividing being done in one single step within the hydrocyclone apparatus, separating the agglomerated gluten from the overflow fraction, and separating the starch from the underflow fraction.

2. A method according to claim 1 wherein the hydrocyclone apparatus into which the mixture is pumped includes a washing section, and fresh water is introduced into the washing section concurrently with the pumping of the aqueous mixture into the hydrocyclone apparatus.

3. A method according to claim 1 in which a portion of the liquid remainder of the overflow fraction after separation of the agglomerated gluten is used for the water in the mixing of water with wheat product.

4. A method according to claim 3 wherein starch is removed from the liquid remainder portion before mixing with the wheat product.

5. A method according to claim 1 wherein the temperature of the mixture in the hydrocyclone apparatus is raised above 30° C.

6. A method according to claim 5 wherein the temperature of the aqueous mixture in the hydrocyclone apparatus is raised to a range of 30° to 50° by introducing pre-heated fresh water.

7. The method according to claim 1 in which the hydrocyclone apparatus has a cylindrical part of 10 to 14 millimeters in diameter.

8. A method according to claim 1 in which there is a pressure drop of from 3 to 6 bars across the hydrocyclone apparatus.

9. A method according to claim 1 in which less than 3 cubic meters of fresh water per ton of wheat flour is used.

10. A method according to claim 1 wherein about 1.5 parts of water is mixed with one part of wheat flour by weight.

* * * * *